United States Patent [19]

Shimotsuji et al.

[11] Patent Number: 5,264,942
[45] Date of Patent: Nov. 23, 1993

[54] IMAGE PROCESSING SYSTEM USING RUN-LENGTH ENCODING OF FILTERED DATA AND ITS REPETITION COUNT

[75] Inventors: Shigeyoshi Shimotsuji, Tokyo; Osamu Hori, Yokohama; Mieko Asano, Kawasaki, all of Japan

[73] Assignee: Kabushiki Kaisha Toshiba, Kawasaki, Japan

[21] Appl. No.: 707,764

[22] Filed: May 30, 1991

[30] Foreign Application Priority Data

May 31, 1990 [JP] Japan .................................. 2-140043

[51] Int. Cl.⁵ .............................................. H04N 1/40
[52] U.S. Cl. ................................ 358/261.1; 358/432; 358/433
[58] Field of Search ............ 358/405, 426, 427, 261.1, 358/261.2, 261.3, 261.4, 262.1, 447, 448, 453, 432, 433; 382/56

[56] References Cited

U.S. PATENT DOCUMENTS

4,667,251  5/1987  Hasegawa ........................... 358/427

OTHER PUBLICATIONS

"A High Speed Raster To Vector Conversion Algorithm For Drawing Processing", H. Matsushima, et al: Mar. 13, 1988, Hitachi Central Research Laboratory, 2-229 no translation.
Patent Abstract of Japan-vol. 12, No. 16 (p-656) Jan. 19, 1988 & JP-A-62 172 485 (Nippon Telegr & Teleph Corp.) Jul. 29, 1987-*Abstract*.
Conference Proceedings IEEE Southeastcon '87, Tampa, Florida, Apr. 5-8, 1987, Publ. IEEE, New York, US-pp. 6-10, B. R. Pracht et al., 'Adaptations of Run-Length Encoding for Image Data'.

Primary Examiner—Edward L. Coles, Sr.
Assistant Examiner—Jerome Grant, II
Attorney, Agent, or Firm—Oblon, Spivak, McClelland, Maier & Neustadt

[57] ABSTRACT

With an image processing system, to-be-processed image data is run length coded. The pattern type of 1×M pixels of each row of the to-be-processed image data and a repetition count of the 1×M pixel pattern in the row direction are obtained. The run-length coded to-be-processed image data is logically filtered in accordance with the pattern type of the 1×M pixel pattern and its repetition count, thereby obtaining run-length coded processed image data.

5 Claims, 6 Drawing Sheets

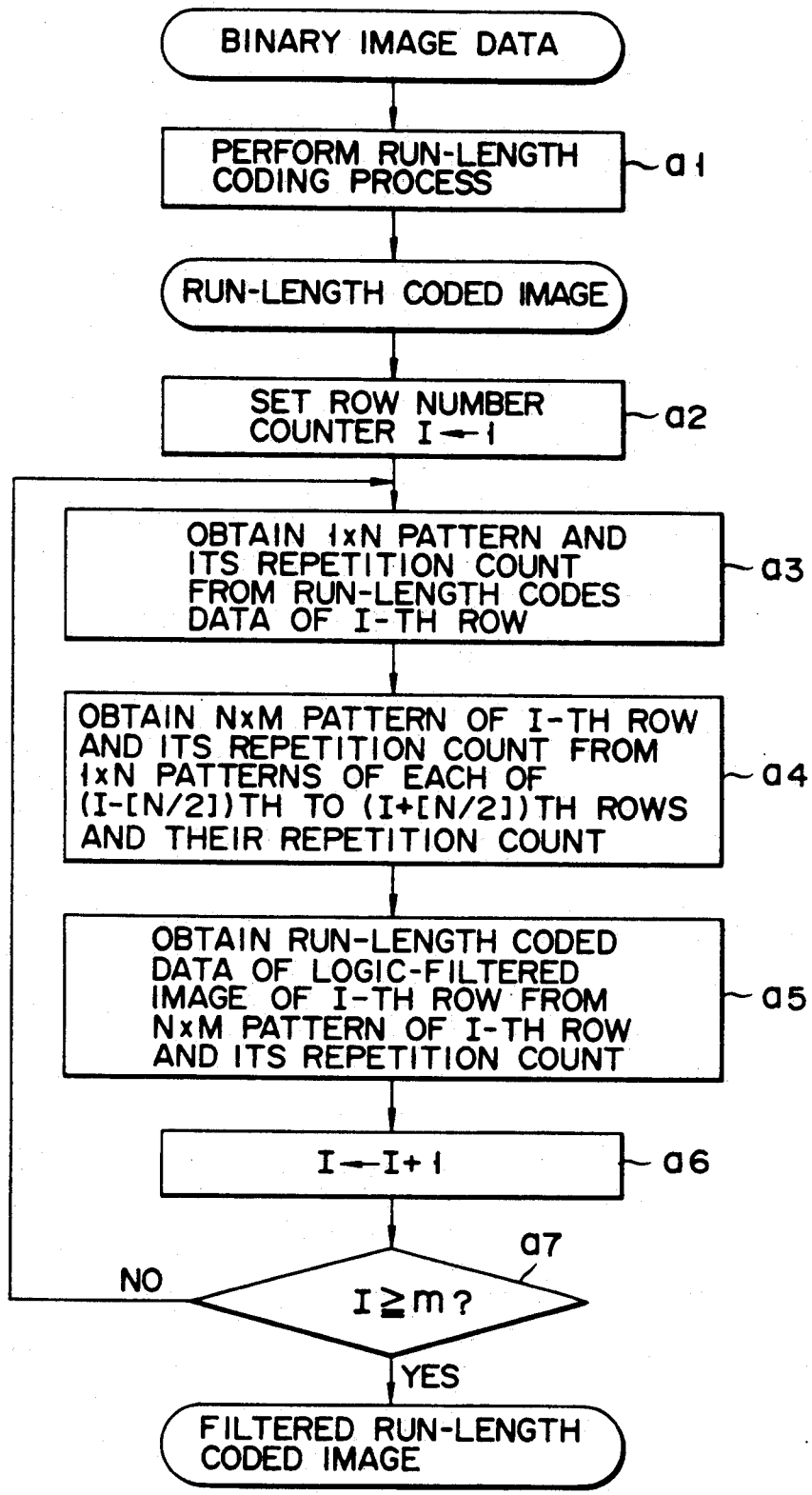
F I G. 2

| ROW | RUN-LENGTH CODE |
|---|---|
| 1 | W16 |
| 2 | W16 |
| 3 | W2, B5, W1, B1, W7 |
| 4 | W7, B5, W1, B2, W5 |
| 5 | W7, B1, W8 |
| 6 | W7, B1, W8 |
| 7 | W8, B6, W2 |
| 8 | W9, B1, W6 |
| 9 | W9, B1, W6 |
| 10 | W4, B4, W1, B1, W6 |
| 11 | W3, B1, W4, B1, W7 |
| 12 | W3, B1, W5, B5, W2 |
| 13 | W3, B1, W12 |
| 14 | W2, B1, W13 |
| 15 | W16 |
| 16 | W16 |

| ROW | (1×3) PATTERN |
|---|---|
| 6 | (1,0,6)(7,1,1)(8,2,1)(9,4,1)(10,0,6) |
| 7 | (1,0,7)(8,1,1)(9,3,1)(10,7,4)(14,6,1)(15,4,1)(16,0,1) |
| 8 | (1,0,8)(9,1,1)(10,2,1)(11,4,1)(12,0,4) |

FIG. 5

| ROW | 3×3 PATTERN |
|---|---|
| 7 | (9,305,1)(10,184,1)(11,120,1)(12,56,2)(14,24,1) |

FIG. 6

| ROW | RUN-LENGTH CODE |
|---|---|
| 1 | W16 |
| 2 | W16 |
| 3 | W2, B1, W13 |
| 4 | W7, B1, W2, B1, W5 |
| 5 | W16 |
| 6 | W16 |
| 7 | W9, B1, W3, B1, W2 |
| 8 | W16 |
| 9 | W16 |
| 10 | W16 |
| 11 | W8, B1, W7 |
| 12 | W13, B1, W2 |
| 13 | W16 |
| 14 | W2, B1, W13 |
| 15 | W16 |
| 16 | W16 |

FIG. 7

IMAGE PROCESSING SYSTEM USING RUN-LENGTH ENCODING OF FILTERED DATA AND ITS REPETITION COUNT

BACKGROUND OF THE INVENTION

1. Field of the Invention

The present invention relates to an image processing system in an image processing apparatus, capable of efficiently logically filtering run-length coded binary image data.

2. Description of the Related Art

In an image processing apparatus such as an OCR (Optical Character Reader) and an optical drawing reader, to-be-processed image data is generally expressed as a binary image using two types of data, i.e., 0 and 1. When a binary image thus expressed is subjected to a logic filtering process such as feature detection and thinning (processing to convert a thick line segment to a thin line segment), it is usually subjected to TV raster scanning to extract a pattern of $N \times M$ pixels having an interest pixel as a center, and is then subjected to predetermined processing in accordance with the extracted pattern. However, in order to execute such processing for extracting the $N \times M$ pattern, a memory storing the binary image must be accessed frequently. Since the number of access times is large, the processing speed becomes low.

When the to-be-processed image data is to be expressed as binary data in units of pixels, the data amount of the image data becomes very large. For this reason, the image data is subjected to run-length coding in units of rows, so that the image data is expressed in a compressed data form. When run-length coded to-be-processed image data is subjected to the above-mentioned logic filtering process, however, the compressed image data must be expanded to the original image data expressed in units of pixels. When the original image data is subjected to predetermined logic filtering processing, it must be then subjected to run-length coding again. In this manner, when run length coded to-be-processed image data is subjected to the logic filtering processing, the entire image processing becomes very complicated.

Conventionally, as described above, when binary image data is subjected to the logic filtering processing, the memory storing the binary image data must be accessed frequently in order to obtain the $N \times M$ pixel pattern as the unit pattern of the image data to be processed, resulting in a low processing speed. In addition, when the to-be-processed image data is given in the form of run-length coded data, the run-length coded data must be restored to the original binary image data, resulting in logic filtering of a very low processing efficiency.

SUMMARY OF THE INVENTION

It is an object of the present invention to provide an image processing system capable of performing efficient logic filtering processing of to-be-processed image data compressed by run-length coding at a high speed.

According to the present invention, there is provided an image processing system in which a type of a pattern $N \times M$ pixels and the repetition count of the $N \times M$ pixel patterns of the same type in the row direction of run-length coded to-be-processed image data are obtained from run-length data of each row, and the run-length coded image data is subjected to logic filtering processing in accordance with the $N \times M$ pixel pattern type and its repetition count, thereby obtaining run-length coded processed image data.

More specifically, the type of $1 \times M$ pixel pattern of each row and the repetition count of the $1 \times M$ pixel patterns of the same type are obtained from the run-length data of each row of to-be-processed image data compressed by run-length coding. Then, the $N \times M$ pixel coded pattern including a target row is obtained from the $1 \times M$ pixel pattern type of each of N rows having the target row as the center and the repetition count of the pattern type. A predetermined conversion value corresponding to the $N \times M$ pixel coded pattern is retrieved from a filter table. The $N \times M$ pixel coded pattern is logically filtered in accordance with the conversion value, thereby obtaining run-length coded processed image data.

According to the present invention having the configuration described above, in an image processing apparatus such as an OCR and an optical drawing reader, when to-be-processed image data compressed in accordance with run-length coding is subjected to predetermined logic filtering processing, an $N \times M$ pixel coded pattern as the fundamental object for the logic filtering processing can be obtained very easily and efficiently without restoring the to-be-processed image data to the original binary image by data expansion. Then, run-length coded processed image data which is logically filtered in accordance with the $N \times M$ pixel coded pattern can be obtained. As a result, expansion of image data is unnecessary, and pixel data need not be independently accessed, resulting in high-speed, efficient logic filtering processing.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a flow chart showing basic processing step for operating the image processing system according to the embodiment of the present invention;

FIG. 5 shows a $1 \times 3$ pixel coded pattern data of 6th to 8th rows obtained from the run-length coded data of FIG. 4;

FIG. 6 shows a $3 \times 3$ pixel coded pattern of the 7th row obtained from the $1 \times 3$ pixel coded pattern shown in FIG. 5;

FIG. 7 shows logically filtered run-length coded data; and

DETAILED DESCRIPTION OF THE PREFERRED EMBODIMENTS

Figure 1:
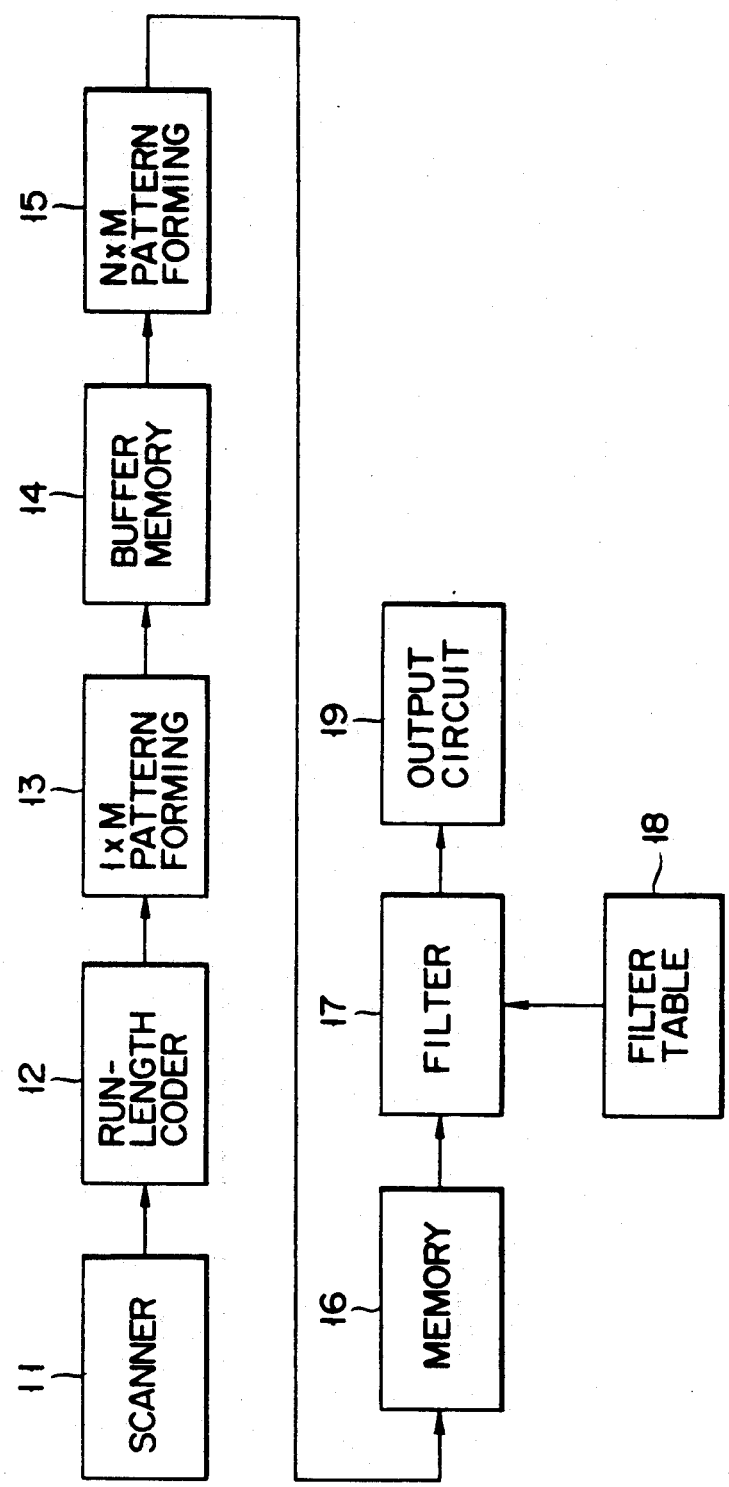
FIG. 1 is a block diagram of an image processing apparatus used for embodying an image processing system according to an embodiment of the present invention.

According to an image processing apparatus shown in FIG. 1, a scanner 11 optically scans an image and outputs binary image data. The output terminal of the scanner 11 is connected to the input terminal of a run-length coder 12. The coder 12 performs run-length coding of the binary image data output from the scanner 11 and outputs run-length coded data to be described later. The output terminal of the coder 12 is connected to the input terminal of a 1×M (1×3 in this embodiment) pattern forming circuit 13. The 1×M pattern forming circuit 13 converts the run-length coded data to 1×M (1×3) pixel coded pattern data in accordance with a method to be described later. The output terminal of the pattern forming circuit 13 is connected to the write terminal of a buffer memory 14. The buffer memory 14 stores the 1×M pixel coded pattern data. The readout terminal of the buffer memory 14 is connected to the input terminal of an N×M (3×3 in this embodiment) pixel coded pattern forming circuit 15. The pattern forming circuit 15 converts the 1×M pattern data to N×M pixel coded pattern data in accordance with a method to be described later. The output terminal of the N×M pattern forming circuit 15 is connected to the write terminal of a memory 16 for storing the N×M pixel coded pattern data. The readout terminal of the memory 16 is connected to one input terminal of a filter circuit 17. The filter circuit 17 filters the N×M pixel coded pattern data by using a filter coefficient sent from a filter table 18 in accordance with the data content. The output terminal of the filter circuit 17 is connected to the input terminal of an output circuit 19. The output circuit 19 outputs the filtered N×M pixel coded pattern data directly, or after restoring it to bit pattern data, i.e., binary image data.

An image processing system according to the embodiment to the present invention will be described with reference to FIG. 2.

First, logic filtering processing for feature extraction or thinning of to-be-processed image expressed as binary data will be described. According to this logic filtering processing, assuming that the image size of a to-be-processed image is X×Y and that binary image data expressed by using two values of "0" and "1" is Iij (i=1, 2, ..., Y, j=1, 2, ..., X), a processing result Jij obtained by filtering image data can be expressed as a function of f:

$$Jij = f[P(Iij)]$$

where P(Iij) is a value expressing an N×M pixel coded pattern having a to-be-processed pixel Iij as the center. When the N×M two-dimensional pattern is expressed as N×M-bit one dimensional array data, its (l×N+k)th bit corresponds to the value of $I_{i-[N/2]+k, j-[M/2]+1}$ (represented by 1 and 0) where [N] is a maximum integer not exceeding N.

More specifically, when the N×M pixel coded pattern is a 3×3 pixel coded pattern (N=M=3), P(Iij) is expressed as bit string data

[Ii−1, j−1, Ii, j−1, Ii+1, j−1,
Ii−1, j, Ii, j, Ii+1, j
Ii−1, j+1, Ii, j+1, Ii+1, j+1]

Since P(Iij) of the N×M pixel coded pattern is an N×M bit value, the filtering function f can be expressed as a function having N×M-bit integer data as an input. The input data, i.e., the N×M pixel coded pattern data is expressed as a finite integer. Hence, the filtering function f can be obtained by, e.g., referring to the filter table 18.

Accordingly, for a processing for obtaining features, such as a branching point and a terminal point, in a binary image, a processing which is typical logic filtering processing of image data, the function f with respect to an interest pixel can be determined by the value of the N×M pixel coded pattern, so that the filtering function f described above can be obtained by referring to a table having a 9 bit entry. The present invention is characterized in that, in accordance with the study concerning the logic filtering processing, run-length coded to-be-processed image data is directly subjected to the logic filtering processing by referring to a table without being restored to the original image data by data expansion.

The steps of image processing according to the embodiment of the present invention will be described with reference to the flow chart of FIG. 2.

Figures 3, 4:
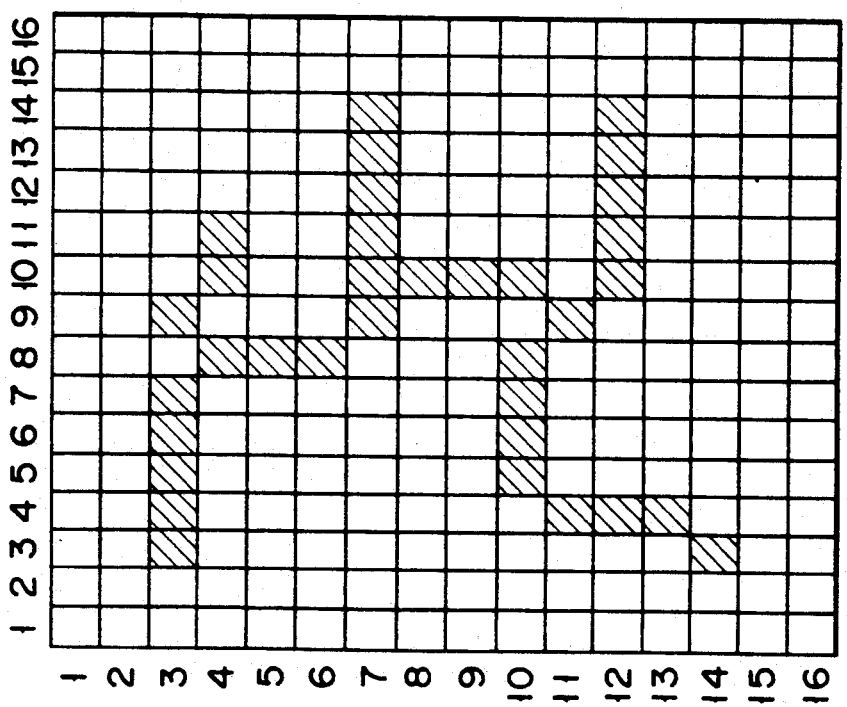
FIG. 3 shows a binary image pattern of a to-be-processed image.
FIG. 4 shows run-length coded data having the binary image pattern shown in FIG. 3.

The binary image data output from the scanner 11 is run-length coded by the coder 12 to obtain run-length coded image data (step a1). In the run-length coding processing, when e.g., 16×16 pixel binary image data is supplied to the run-length coder 12 as the to-be-processed image from the scanner 11, as shown in FIG. 3, the run-length coder 12 obtains the repetition counts of black and white pixels, respectively, in units of rows, and expresses them as binary image data in the data format shown in FIG. 4. Referring to FIG. 4, note that reference symbols Wk and Bk represent a run-length coded code string. Wk is a white link component having a length of k bits. Bk is a black link component having a length of k bits. For example, W7, B1, and W8 of the 7th row represent 7 repetitive white pixels, 1 black pixel, and 8 repetitive white pixels, respectively.

The image data run-length coded in this manner is subjected to the logic filtering processing by the 1×M pattern forming circuit 13 in the following manner. In this case, first, the value of the row number counter specifying a row of the run-length coded image data is initialized to [1] (step a2). Then, the 1×M pixel coded pattern of the Ith row designated by the count of the counter and the repetition count of the 1×M pixel coded pattern identical with the pixel coded pattern of the Ith row are obtained (step a3). For example, when a 3×3 pixel coded pattern is subjected to the logic filtering processing, a 1×3 pixel coded pattern and the repetition count of the 1×3 pixel coded pattern identical with it are obtained. There are 8 pattern types Pk represented by 3 bits as follows:

[000] [010] [010] [011] [100] [101] [110] [111]

These pattern types Pk are sequentially expressed by using addresses [0] to [7]. Assume that a pattern start position is designated as [x] and the pattern repetition count is designated as L. Of the run-length coded image data shown in FIG. 4 described above, for example, the 1×3 pixel coded pattern data of 3 rows with the 7th row as the center, i.e., the pattern data of the 6th, 7th, and 8th rows, are converted by the 1×M pattern forming circuit 13 into the format (X, Pk, L) as shown in FIG. 5. In fine, e.g., (1, 0, 7) of the 7th row in FIG. 5 indicates that the pattern start position is the first column, that the pattern type is represented by an address [0], i.e., [000], and that the pattern repetition count is 7.

Then, in accordance with the 1×3 pixel coded pattern data obtained in this manner, the 3×3 pixel coded pattern of the Ith row is obtained from three 1×3 pixel coded patterns of (I−1)th, Ith, and (I+1)th rows (patterns of 6th, 7th, and 8th rows in this embodiment) (step a4). This processing is performed by the N×M pattern forming circuit 15 by obtaining a maximum segment among segments [Xa, Xb] in which the three 1×3 pixel coded patterns of the (I−1)th, Ith, and (I+1)th rows are identical. As a result of this processing, the 3×3 pixel coded pattern data as shown in FIG. 6 is obtained as one corresponding to the 7th row of the to-be-processed image shown in FIG. 3. This 3×3 pixel coded pattern is also expressed in the data format (X, Pk, L). As the pattern types Pk for the 3×3 pixel coded pattern, there are a total of 512 types including 000 100 111

000 000 ... 111

000 000 111

These pattern types Pk are expressed by using addresses [0] to [511]. Filter coefficients corresponding to the individual pattern types are assigned to these addresses to form the filter table 18. Therefore, when addresses corresponding to the individual pattern types are input to the filter table 18, filter coefficients for the individual pattern types are input to the filter circuit 17.

The filter circuit 17 performs the logic filtering processing by obtaining an output value corresponding to the function f (filter coefficient) of (X, f(Pk), L) in accordance with the data (X, Pk, L) of the 3×3 pixel coded pattern (step a5).

In the 3×3 pixel coded pattern data of FIG. 6, e.g., (9, 305, 1) indicates that the pattern start position is [9], that the pattern type of the 3×3 pattern is an address [305] corresponding to the following pattern:

100

011

001 and that the number of patterns of this pattern type is 1.

When the output values of the function f are expressed by 0 and 1, the filtering processing result can also be expressed by using Wk and Bk that are run-length coded expressions. Accordingly, when the filter circuit 17 filters the 3×3 pixel coded pattern data by referring to the filter table 18, as described above, logically filtered run-length coded data as shown in FIG. 7 can be obtained.

The logic filtering processing for the run-length coded data in accordance with the processing steps described above is performed by incrementing the row number counter (step a6) and repeating the processing steps described above until the last row (step a7). In fine, according to this image processing system, image data can be logically filtered by directly using run-length coded data, i.e., without restoring it to original image data. In addition, 1×3 pixel coded patterns are sequentially obtained, the 3×3 pixel coded pattern is obtained in accordance with the obtained 1×3 pixel coded patterns, and the table is searched in accordance with the obtained 3×3 pixel coded pattern, thereby obtaining logically filtered run-length coded data. Therefore, compared to a conventional system in which image processing is performed by frequently accessing a memory storing image data, image processing can be efficiently executed at a very high speed, obtaining considerably practical effects.

Thinning, for example, as the typical logic filtering processing of image processing, may be performed by repeatedly performing the filtering processing f described above for the to-be-processed image until a certain stop condition is satisfied, for example, the processed result ceases to change.

Assume that a process for a single frame image is called a sub-cycle. A case will be described in which logic filtering processing having different processes f for its sub-cycles of even numbers and those for odd numbers is to be performed. Note that each sub-cycle can be performed in completely the same manner as the process described previously for obtaining the feature.

In this processing, 1×3 pixel coded pattern data of the respective rows are formed as described above from the run length coded code string of the to-be-processed image. Then, 3×3 pixel coded pattern data is formed as described above from the 1×3 pixel coded patterns of the respective ones of the three rows including the target or interest row at center. The formed 3×3 pixel coded pattern data is subjected to the logic filtering processing as described above to obtain the run-length coded data for the respective rows.

In the subsequent sub-cycle, the run-length coded data formed by the filtering processing is subjected to the same processing as the to-be-processed data. Namely, the subsequent sub-cycle is started in the same manner by using the run-length coded data obtained in the previous sub-cycle as the to-be-processed data. This procedure is repeated until this sub-cycle reaches a predetermined stop condition.

When no change occurs in any of the to-be-processed images, this fact is the sub-cycle stop condition for thinning. Alternatively, predetermined sub-cycle repetition times can be the stop condition. The former stop condition can be rephrased as that no change has occurred in the run-length codes of the respective rows of each sub-cycle.

Processing for each row is determined by the code string of the preceding three rows. In thinning, two types of sub-cycle processing are performed for each row. From this operation, it is possible to determine that, when no change has occurred in the run-length coded data of the (y−1)th, yth, and (y+1)th rows with respect to a certain row y both in the previous sub-cycle and a sub-cycle preceding that, apparently no change will occur in them in the sub-cycles of the row y. In this case, accordingly, the filtering processing described above need not be performed for the yth row but merely the run-length coded data need be copied to obtain the filtering result. When this system is employed, the repetitive filtering processing can be performed at a high speed.

Figure 8:
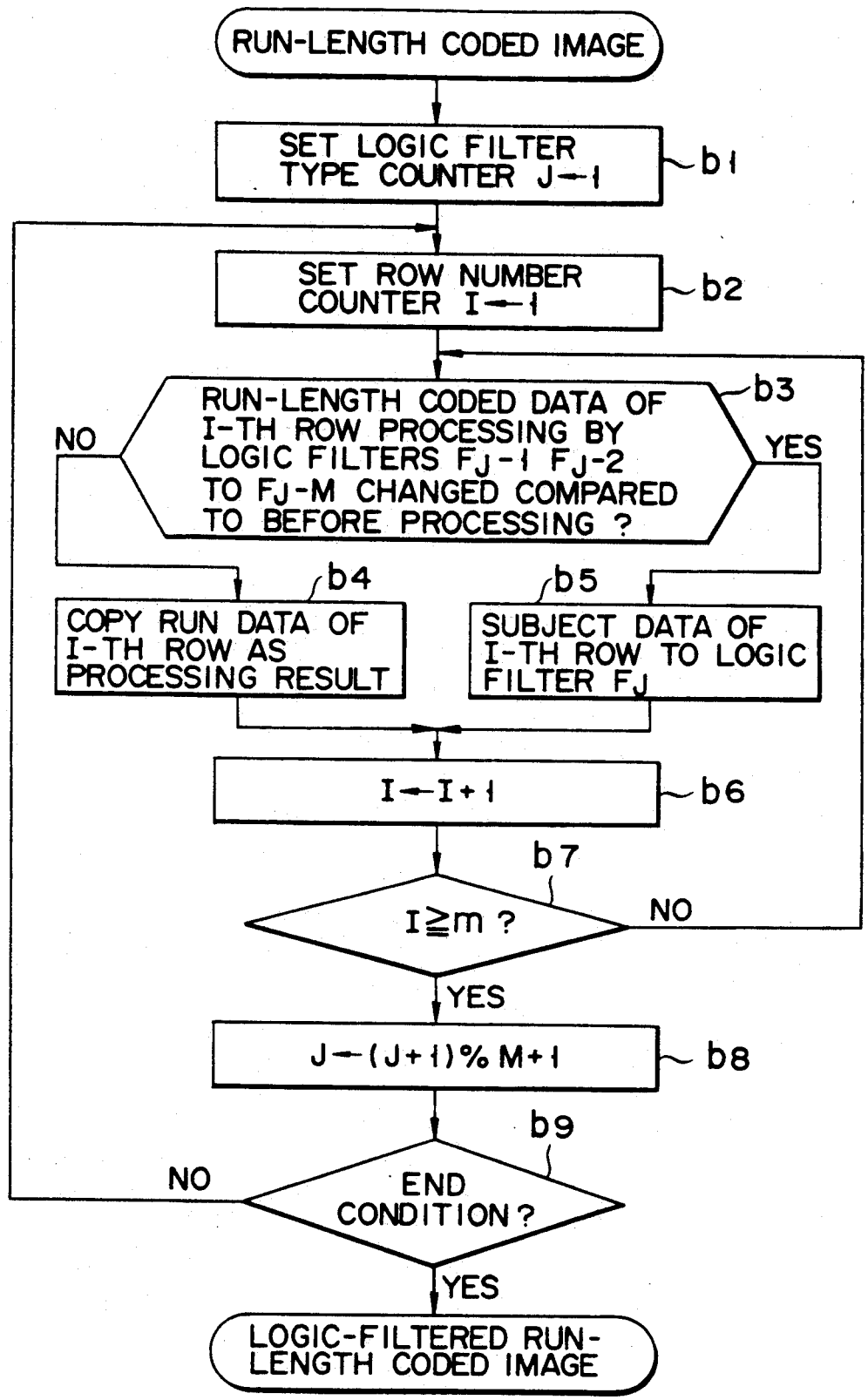
FIG. 8 is a flow chart showing the steps of the logic filtering process which is executed repeatedly.

FIG. 8 shows the processing steps when this repetitive logic filtering processing is to be performed. As shown in the flow chart of FIG. 8, when the logic filtering processing is to be performed, the count of a counter J specifying the filtering type is initialized to [1] first (step b1), and then the count of the row number counter I is initialized to [1] (step b2). In this state, run-length coded data of the 1st row is subjected to the logic filtering processing to check whether or not any change has occurred in the data after processing (step b3). If NO in step b3, the data of the Ith row is copied as it is as the processing result (step b4). If YES in step b3, the data of the Ith row is subjected to the logic filtering processing described previously (step b5).

Steps b3 to b5 are repeated while incrementing the row number counter I until all the rows are processed (steps b6 and b7). Then, when another sub-cycle is completed, the count of the counter J specifying the logic filtering type is updated (step b8). These steps are repeated until a predetermined end condition is satisfied (step b9).

When the sub-cycle processing is repeated in this manner, the logic filtering processing such as feature detection and thinning, which are typical in image processing, can be performed efficiently at a high speed.

The present invention is not limited to the embodiment described above. In the embodiment, the number of sub-cycle types is 2. However, the present invention can be similarly achieved even if the number of sub-cycles types is 3 or more. In the above embodiment, the $1 \times M$ pixel coded pattern and the $N \times M$ pixel coded pattern are expressed as a set of three data including the position. However, the pattern position can be calculated from information on the repetition count of a pixel coded pattern. Therefore, the pixel coded pattern data described above can be subjected to the logic filtering processing similarly and in a simple manner by expressing it as a set of two data including data on the pattern type and data on the repetition count.

As has been described above, according to the present invention, a to-be-processed image which is data-compressed by run-length coding can be directly logically filtered. Therefore, required logic filtering processing can be effectively performed with a small memory capacity. In addition, basic processing of the logic filtering processing for obtaining the $N \times M$ pixel coded pattern can be directly performed for the run-length coded data. Therefore, the processing time can be greatly reduced, and a filtering processed image can be efficiently obtained within a short period of time resulting in many practical effects.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. An image processing system including:
  a first step of obtaining a type of an $N \times M$ pixel coded pattern, extracted from to-be-processed image data which is compressed by run-length coding, and a repetition count of the $N \times M$ pixel coded pattern in the row direction; and
  a second step of logically filtering the to-be-processed image data in accordance with the type of the $N \times M$ pixel coded pattern and the repetition count of the identical $N \times M$ pixel coded pattern, thereby obtaining run-length coded processed image data.

2. A system according to claim 1, wherein the first step includes a step of obtaining a type of a $1 \times M$ pixel coded pattern and a repetition count of the $1 \times M$ pixel coded pattern, and the second step includes a step of obtaining an $N \times M$ pixel coded pattern of a target row from the type of the $1 \times M$ pixel coded pattern of each of N rows having the target row as the center and from a repetition count of the coded pattern 3. A system according to claim 2, wherein the second step is enabled by a step of logically filtering the to-be-processed image data by a conversion value which is read out from a table by using the $N \times M$ pixel coded pattern and the repetition count thereof as addresses, thereby obtaining run-length coded processed image data.

4. A system according to claim 1, wherein when the second step of logically filtering the to-be-processed image data based on the $N \times M$ pixel coded pattern is performed by sequentially repeating a filtering processing f (f=1, ..., K) for all the images, the step includes a step of, if no change occurs in M rows having a certain row as the center after the processing f, copying a run code of the certain row instead of performing the filtering processing f for the certain row.

5. An image processing system including:
  a binary conversion step of scanning an image to convert image data to binary image data;
  a coding step of run-length coding the binary image data to obtain run length coded to-be-processed image data;
  a step of extracting an $N \times M$ pixel coded pattern from the run-length coded to-be-processed image data;
  a step of obtaining a pattern type of the $N \times M$ pixel coded pattern and a repetition count of the $N \times M$ pixel coded pattern; and
  a step of logically filtering the to-be-processed image data in accordance with the pattern type of the $N \times M$ pixel coded pattern and the repetition count of the N x M pixel coded pattern, thereby obtaining run-length coded processed image data.

* * * * *